Oct. 19, 1937. J. M. AUFIERO Re. 20,531

HEATER

Original Filed June 19, 1934 2 Sheets-Sheet 1

INVENTOR.
JOHN M. AUFIERO,
BY Sullo & Kane
ATTORNEYS.

Oct. 19, 1937. J. M. AUFIERO Re. 20,531

HEATER

Original Filed June 19, 1934 2 Sheets-Sheet 2

INVENTOR.
JOHN M. AUFIERO,
BY
Duell & Kane
ATTORNEYS.

Reissued Oct. 19, 1937

Re. 20,531

UNITED STATES PATENT OFFICE 20,531

HEATER

John M. Aufiero, Manhasset, N. Y., assignor to E. A. Laboratories, Inc., Brooklyn, N. Y., a corporation of New York Original No. 2,032,786, dated March 3, 1936, Serial No. 731,244, June 19, 1934. Application for reissue February 6, 1937, Serial No. 124,515

9 Claims. (Cl. 257—137)

This invention relates to a structurally and functionally improved form of heater, and in its more specific aspects aims to provide an apparatus of this nature particularly intended for use in connection with motor vehicles and in other installations where a source of hot water, steam or its equivalent is available, and where a small space is to be efficiently heated.

It is an object of the invention to provide an apparatus of this character, the parts of which will be relatively few in number and individually rugged and simple in construction, these parts being capable of production largely by the use of automatic machinery and being thereupon susceptible to assemblage by relatively unskilled labor, with minimum expense to provide a unitary apparatus operating over long periods of time with freedom from difficulty.

A further object of the invention is that of furnishing an apparatus of this nature by means of which heat may be readily and efficiently distributed in any desired manner throughout the enclosure to be warmed, and in which the parts, when adjusted to assume the desired positions, will remain in such position until they are deliberately readjusted.

A further object of the invention is that of furnishing an apparatus of this nature which may readily be coupled to the circulating system of an internal combustion motor or otherwise and regardless of the space limitations of the mounting surfaces peculiar to the motor vehicle within which the heater is to be disposed.

With these and other objects in mind, reference is had to the attached sheets of drawings illustrating one practical embodiment of the invention, and in which:—

Figure 1:
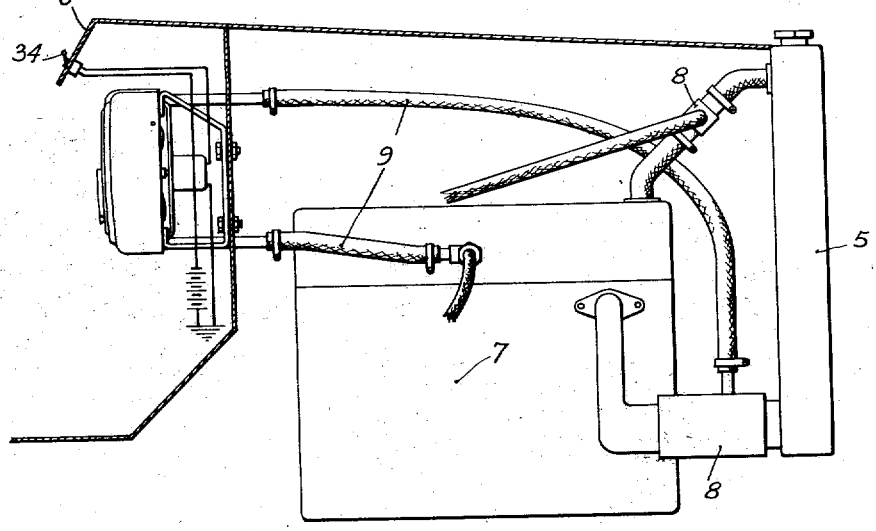
Fig. 1 shows diagrammatically the forward portion of a motor vehicle with which the heater is associated.

Referring primarily to Fig. 1, it is to be understood that in this view there is illustrated in somewhat schematic manner one method of mounting and coupling a heater of the present type. Obviously this heater may be mounted in numerous other manners, and need not necessarily be coupled to an internal combustion motor, but might have some other primary source of heat.

Thus, in this view, the numeral 5 indicates the radiator of a motor vehicle, and 6 the dash of the vehicle mounting such radiator. 7 indicates a motor of the water cooled type, which is provided with water manifolds 8 connecting its jacket with the radiator, and which jacket and/or manifold may be tapped by tubes 9, so that a certain amount of the cooling fluid may be diverted through the heater, as hereinafter described. In the usual manner, one or both of these manifolds may be provided with valves (not shown), controlled either manually or automatically through the action of a thermostat or otherwise. The foregoing—except in so far as may be indicated by the claims—forms no part of the present invention, and the various structures which may be employed in this connection are well known to those skilled in the art.

Figure 2:
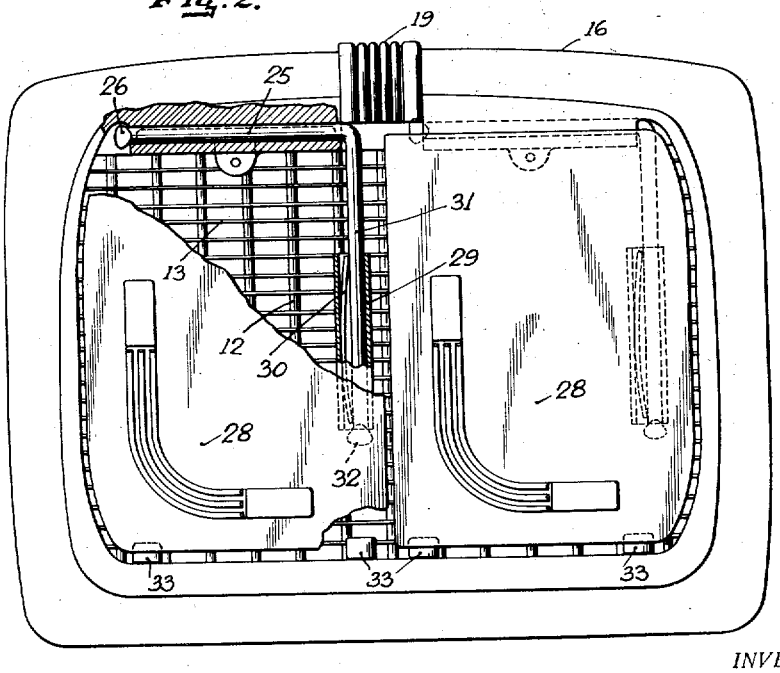
Fig. 2 is a face view showing certain of the parts broken away to disclose the underlying construction.
Figure 4:
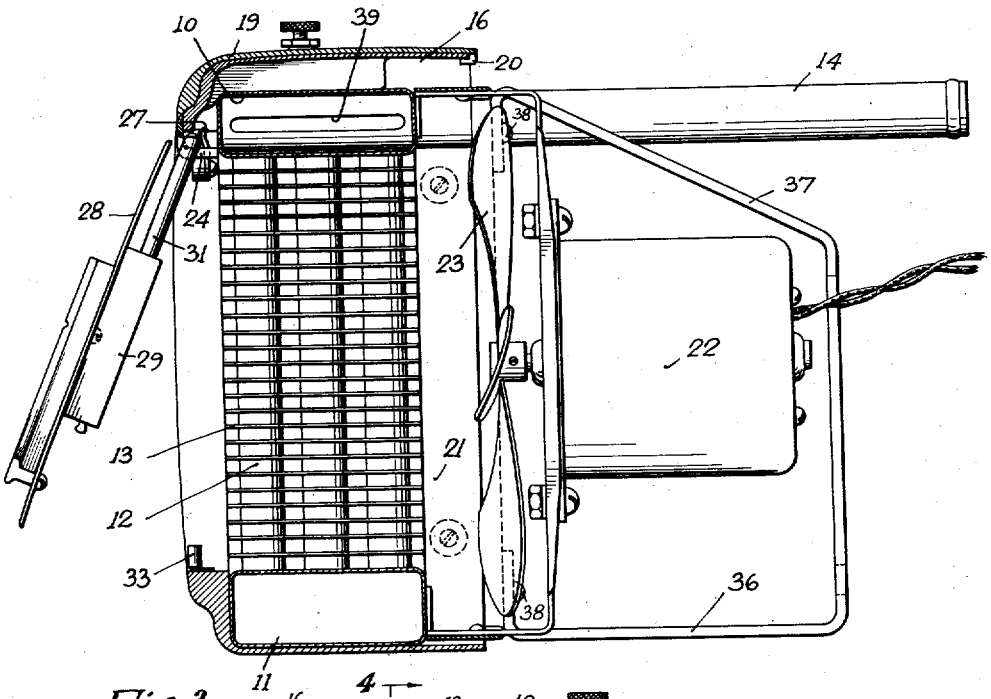
Fig. 4 is a transverse sectional view taken along the lines 4—4 and in the direction of the arrows as indicated in Fig. 3.
Figure 3:
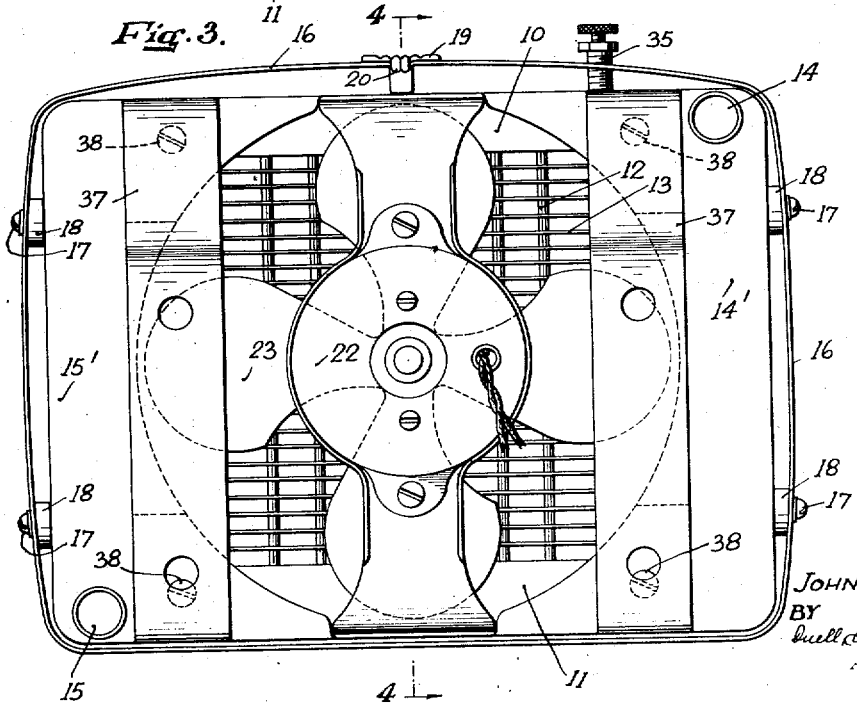
Fig. 3 is a rear view of the heater.

As shown in Figs. 2 to 4, the heater proper may include spaced heads 10 and 11, between which extend tubes 12 having fins or other heat dissipating surfaces 13. Connected, as shown, to one corner of the upper head is a tube 14, a similar tube 15 being connected preferably at the diametrically opposite corner of the other head, it being noted that strips 14′ and 15′ may be provided to each side of the unit.

With a view to protecting this heating unit and also to properly finish the same and provide a mounting for its associated parts, an enclosing casing 16 may be secured thereto in any suitable manner, as for example by employing bolts 17 and spacing washers 18. Associated with this casing is a finishing strip 19, which is preferably mounted centrally of the unit and extends transversely across the upper portion of the casing. This member may be secured in position, as for example by a clip structure 20, it being obvious that bolts or other supplemental or substitute securing elements may also be utilized. In this manner it is entirely feasible to finish the casing with chrome-nickel or other suitable material and still have the strip 19 formed of contrasting material without it being necessary to mask the entire casing to secure this result. Moreover, by mounting the strip 19 as heretofore brought out, it will serve as a movement limiting structure in a manner hereinafter to be described.

A frame member 21 is suitably secured to the rear of the heating unit or core, and this member may mount a motor casing 22 from which a power driven fan shaft 23 extends. In line with the air column developed by this fan the member 21 is, of course, provided with an opening, and it is obvious that as the motor 22 operates, air currents will be driven between the tubes 12 and the heat dissipating structures associated therewith, and be projected beyond the forward face of the casing.

With a view to controlling these air currents, the casing is provided with portions 24, bent to form mountings for rods 25, the ends of these rods extending beyond these casing portions and being enlarged as at 26 to prevent their accidental withdrawal therefrom. Yielding clip elements 27 are also mounted by these casing portions and bear against the rods to impede their oscillation. Consequently, these rods may be shifted to any desired position, and will remain in such positions until they are again shifted. A pair of panels 28 are provided, and these panels are of sufficient area so that when arranged in the manner shown in Fig. 2, they substantially cover or obstruct the entire open face of the unit. Each panel is provided with a socket 29, within which a spring 30 may be disposed for the purpose of bearing against the downwardly bent end portions 31 of the rods 25. Accordingly at this point a frictional structure is again provided which will allow of each panel being swung with respect to the rod mounting the same, but which will prevent an accidental shifting of the parts. Moreover, the outer end of each rod may be headed, as at 32, so as to prevent their accidental withdrawal from the rod receiving portions or sockets 29. To prevent or guard against too great an inward movement on the part of the panels, stop elements 33 may be associated with the core and/or casing, and these abut—as shown—the lower free edges of the panels. It will be obvious that an operator, by permitting the rod to remain in the position shown in Fig. 2, but by swinging either panel or both of the same to any desired degree, will assure a flow of warmed air sidewise with respect to the unit. If the panels be swung to a sufficient extent, this flow of air will, in fact, be substantially axial with respect to the core. Conversely, if the panels are not swung with respect to the rod portions 31, but if the latter are merely swung upwardly, air will be directed downwardly. By using any desired combination of these factors, and properly correlating the individual panels, it is apparent that any desired directional blast of heated air may be secured. It will be appreciated that in connection with this feature of the invention the motor 22 is connected to a source of suitable current, such as the storage battery of the motor vehicle, and that a switch 34 may be employed for controlling the operation of the motor and fan. Also the strip 19 will serve as a stop element to limit movement of the parts by contacting with the rod portion 31.

The casing 16 may, of course, be provided with an opening for the accommodation of an air vent 35, which latter is preferably affixed to the upper head associated with the core. This casing, and especially the mounting member 21 associated therewith, provides a proper support for brackets 36 which are formed with angular offset portions 37 and rear portions extending beyond the motor casing 22. It will be observed that as illustrated these rear portions of the brackets 36 are relatively reduced, so that they may properly engage a mounting surface even if the latter is relatively limited. As has been especially illustrated in Fig. 3, the points of attachment 38 of these brackets with the mounting member are all preferably equally spaced. In this manner it is feasible for an operator, after loosening the connecting element at 38, to arrange the brackets by reversing or sidewise shifting the same with respect to the heater unit, so that the heater will properly fit under the cowl of virtually any make of motor vehicle, it being, of course, understood that by means of the present invention it is even feasible to turn the entire heater sidewise so that this result may be achieved. Such shifting of the unit will in no wise affect the efficiency of the same, because the tubes or openings 14 and 15, instead of being centrally arranged with respect to the core heads, are disposed at opposite ends thereof. Consequently, so long as the unit is turned substantially ninety degrees, the tubes or openings will still be disposed one above the other, so that no difficulties of operation will be encountered. To this end the strips 14′ and 15′ may be hollow and in the nature of auxiliary heads connecting with the heads 10 and 11 respectively, so that a maximum of efficiency results.

In other words, with a construction of this character it is obvious that brackets 36 may be disposed on the dash to best advantage and the heater may be mounted on these brackets so that the heads 10 and 11 extend either substantially parallel to the bracket bodies or substantially at right angles with respect thereto. It is additionally obvious—having in mind the offset portions 37 of the brackets—that if an operator found it desirable he might simply reverse the brackets to have these portions extend downwardly instead of upwardly with respect to the heater. Additionally, it will be apparent that with the brackets secured against movement with respect to the heater, the entire assembly might be turned to be accommodated to best advantage on the dash and according to the space limitations there existing. In all such instances and whether the heater had been turned to occupy a position inclined, for example, 10 or 90 degrees with respect to that illustrated in Fig. 3, the openings or tubes 14—15 would still occupy different horizontal planes so that a proper flow through the heater would occur.

To increase to even a greater extent the circulation of fluid through this heater, it will be observed, as in Fig. 4, that the tube 14 may terminate within the heads 10 and/or 14′ in a nozzle or slitted portion 39 through which the incoming fluid is discharged into the head. Consequently there is formed a jet which distributes the hot fluid entirely across the head 10 so that all of the tubes 12 will receive substantially equal amounts of the entire fluid.

Thus, among others, the several objects of the invention as specifically afore noted are achieved. Obviously, numerous changes of construction and rearrangement of the parts might be resorted to without departing from the spirit of the invention as defined by the claims.

Having thus fully described the invention, what is claimed is:

1. A heater including a pair of spaced heads, a heat distributing structure interposed between and connected to said heads, one of said heads being formed with an inlet and the other of the same being formed with an outlet opening, the openings in the different heads being disposed in different horizontal planes and in the opposite ends of said heads, and a tube extending into the inlet opening and formed with a slot providing a nozzle for the sidewise distribution of heated fluid throughout the space of the head with which it is associated.

2. A heater including a heat distributing structure, a casing enclosing the edge portions of such structure, a finishing strip removably secured to said casing, a heat deflecting panel to close the front of said casing, and means connected to said casing and to said panel for mounting the latter, said strip providing a stop cooperating with said latter means to limit the movement of the same.

3. A heater including, in combination, a heat distributing structure, a casing for the same, a pair of rods swingingly secured to such casing and having their axes substantially in alignment, offset end portions forming parts of said rods and extending substantially parallel to each other, and panels swingingly secured adjacent their side edge portions to the offset end portions of said rods.

4. A heater including, in combination, a heat distributing structure, a casing for the same, a pair of rods swingingly secured to such casing and having their axes substantially in alignment, enlarged end portions forming parts of said rods to prevent their accidental detachment, offset end portions forming parts of said rods and extending substantially parallel to each other, and panels swingingly secured adjacent their side edge portions to the offset end portions of said rods.

5. A heater including, in combination, a heat distributing structure, a rod swingingly connected thereto, a panel formed with a socket for the accommodation of said rod, and a headed end portion forming a part of said rod and beyond said socket for preventing accidental detachment of the parts.

6. A heater including, in combination, a heat distributing structure, a headed rod swingingly connected thereto, a panel formed with a socket, said rod extending through said socket and with its head beyond the same, and a spring disposed within said socket and frictionally engaging said rod at points short of said head for retarding swinging movements of the panel with respect to said rod.

7. A heater including a pair of spaced heads, a heat distributing structure interposed between and connected to said heads, brackets for supporting said heater, a mounting structure for connecting the ends of such brackets and such structure, such mounting means being spaced equally from each other whereby said brackets may be variously applied to have said heads extending in vertical and horizontal planes with the brackets in either event in the same position, said heater structure with the heads extending in horizontal positions presenting an opening in one head adjacent the left hand corner thereof, and an opening in the other head adjacent the right hand corner thereof.

8. A heater including a pair of spaced heads, a heat distributing structure interposed between and connected to said heads, such heads being formed with openings adjacent one of their ends, and a nozzle disposed within one of such heads and connected to the opening thereof for diverting fluid entering through such opening sideways throughout the area of such head.

9. A heater structure to be mounted to have its parts extend in given directions or to have those parts axially turned in directions at right angles to the given directions, and such heater structure including a pair of spaced heads, a heat distributing structure interposed between and connected to said heads, said heads—with said heater structure disposed in one position—extending in different horizontal planes, one of said heads being formed with an opening adjacent its left hand end while the other of such heads is formed with an opening adjacent its right hand end whereby, if the structure is shifted, such openings will still occupy different horizontal planes, a casing enclosing said heads and formed with an opening in line with said heat distributing structure, a motor operated fan connected to said casing and to the rear of said heat distributing structure, and a bracket connected to said casing and to contact a mounting surface to support said heater structure, said bracket extending to the rear of said fan and presenting a relatively reduced body for engagement with said mounting surface.

JOHN M. AUFIERO.